United States Patent
Ebata et al.

[11] Patent Number: 6,128,147
[45] Date of Patent: Oct. 3, 2000

[54] RECORDING/REPRODUCING METHOD AND APPARATUS FOR STORING DATA IN A MEMORY AFTER DETECTING ERRORS IN REPRODUCED DATA FROM A MAGNETIC TAPE

[75] Inventors: Kazuyoshi Ebata; Hisashi Asano; Toshimasa Araki, all of Tokyo, Japan

[73] Assignee: Sony Corporation, Tokyo, Japan

[21] Appl. No.: 08/833,793

[22] Filed: Apr. 9, 1997

[30] Foreign Application Priority Data

Apr. 13, 1996 [JP] Japan .................................. 8-115407

[51] Int. Cl.⁷ ........................................................ G11B 5/09
[52] U.S. Cl. ................................................................ 360/53
[58] Field of Search ................................. 371/37.4, 37.7, 371/40.16, 40.3; 386/52, 77, 116; 360/53, 77.14; 364/32

[56] References Cited

U.S. PATENT DOCUMENTS

| | | | |
|---|---|---|---|
| 4,630,272 | 12/1986 | Fukami et al. ......................... | 371/37.4 |
| 4,739,420 | 4/1988 | Odaka et al. ......................... | 360/77.14 |
| 4,873,589 | 10/1989 | Inazawa et al. ......................... | 360/53 |
| 5,587,978 | 12/1996 | Endo et al. ............................. | 369/32 |
| 5,809,041 | 9/1998 | Shikakura et al. ..................... | 371/31 |

Primary Examiner—Glenton B. Burgess
Assistant Examiner—Regina Y. Neal
Attorney, Agent, or Firm—Jay H. Maioli

[57] ABSTRACT

An apparatus for recording and/or reproducing digital signals, such as PCM signals, as plural slanted tracks on a magnetic tape, includes a memory, first and second heads, a detection unit and a control unit. The memory stores the digital signals entering a terminal. The first head records the digital signals entering the terminal along with input address information. The second head is positioned on the downstream side of the first head in the running direction of the magnetic tape. The second head reads out the digital signals recorded on the magnetic tape by the first head along with the address information. The detection unit detects whether or not there is any error in the signal read out by the second head. If the signal read out by the second head contains an error, the control unit manages control for holding on memory data containing the address information read out by the second head along with the digital signal associated with the address information and which is adapted to be supplied to the first head.

38 Claims, 3 Drawing Sheets

RECORDING/REPRODUCING METHOD AND APPARATUS FOR STORING DATA IN A MEMORY AFTER DETECTING ERRORS IN REPRODUCED DATA FROM A MAGNETIC TAPE

BACKGROUND OF THE INVENTION

1. Field of the Invention

This invention relates to a recording/reproducing method and apparatus and a reproducing apparatus for a tape-shaped recording medium. More particularly, it relates to a recording/reproducing method and apparatus and a reproducing apparatus in which digital signals are recorded on the tape-shaped recording medium.

2. Description of the Related Art

Up to now, a rotary head type magnetic recording/reproducing apparatus for professional use with accredited high operational reliability has been used on the site of news or data collection. The apparatus of this type mostly has the concurrent monitoring function of recording data and instantaneously reproducing the recorded data.

For example, a digital audio tape recorder realizes this concurrent monitoring function using four heads. If, however, head clogging or large dropout that cannot be corrected by this concurrent monitoring should occur, it can be recognized simply that problems arose in recording, such that data has to be recorded from the outset.

There are also known devices in which all four of the heads are used for reproduction for avoiding the above problem. However, there lacks a device having effective means on the recording side for avoiding the above problem.

If the tape is scratched, data rewriting on the same side by editing is physically impossible. That is, similar dropout occurs during re-recording, thus producing uncorrectable errors.

SUMMARY OF THE INVENTION

It is therefore an object of the present invention to provide a recording/reproducing apparatus for a tape-shaped recording medium.

It is another object of the present invention to provide a reproducing apparatus for a tape-shaped recording medium.

It is yet another object of the present invention to provide a recording/reproducing method for a tape-shaped recording medium.

According to the present invention, there is provided an apparatus for recording and/or reproducing digital signals, such as PCM signals, as plural slanted tracks on a magnetic tape, including a memory, first and second heads, a detection unit and a control unit. The memory stores the digital signals entering a terminal. The first head records the digital signals entering the terminal along with the input address information. The second head is positioned on the downstream side of the first head in the running direction of the magnetic tape. The second head reads out the digital signals recorded on the magnetic tape by the first head along with the address information. The detection unit detects whether or not there is any error in the signal read out by the second head. If the signal read out by the second head is found by the detection unit to contain an error, the control unit manages control for holding on memory data containing the address information read out by the second head and the digital signal associated with the address information and which is adapted to be supplied to the first head.

According to the present invention, there is provided an apparatus for recording and/or reproducing digital signals including a memory, an encoder, first and second heads, a decoder and a control unit. The encoder applies error correction to the supplied digital signals. The first head records the data outputted by the encoder on a magnetic tape along with the address information. The second head is positioned on the downstream side of the first head in the running direction of the magnetic tape. The second head reads out the data recorded by the first head along with the address information. The decoder applies error correction decoding to data from the second head. If the signal read out by the second head at the time of the decoding by the decoder is found to contain an error, the control unit manages control for holding on memory the address information found to be in error and the digital signals associated with the address information and which is supplied to the first head.

According to the present invention, there is also provided a reproducing apparatus for a magnetic tape. The magnetic tape has a first area where the digital signals are recorded along with the address information and a second area where correct digital signals corresponding to a portion subjected to error at the time of recording on the first recording area have been recorded along with the address information. The apparatus includes a head, a memory and a control unit. The head reads out the signals recorded on the magnetic tape. The memory stores the digital signals recorded in the second area of the magnetic tape read out by the head. The control unit substitutes data stored in the memory for the portion of the signal read out by the head which is subjected to error at the time of recording and outputs the substituted data.

According to the present invention, there is further provided a recording/reproducing method for a tape-shaped recording medium including recording digital signals supplied by a first head via a memory on the tape-shaped recording medium along with the address information, reading out the digital signals recorded by the first head on the tape-shaped recording medium along with the address information by a second head positioned on the downstream side of the first head in the running direction of the tape-shaped recording medium, detecting if there is any error in the signal read out by the second head, and causing data containing the address information read out by the second head and the digital signal supplied to the first head to be stored in the memory if, as a result of the detection, the signal read out by the second head contains an error. The digital signal supplied to the first head is the signal associated with the address information.

According to the present invention, as described above, digital signals are stored in the memory at the same time that the signals are recorded on the magnetic tape. The digital signals recorded on the magnetic tape are read out and checked as to whether or not there is any error in the digital signals. If there is any error, the digital signals in error, stored in the memory, are held and recorded on the magnetic tape. If there is any dropout caused in the magnetic tape, the digital signals can be recorded in their entirety on the magnetic tape.

DESCRIPTION OF THE PREFERRED EMBODIMENTS

Figure 1:
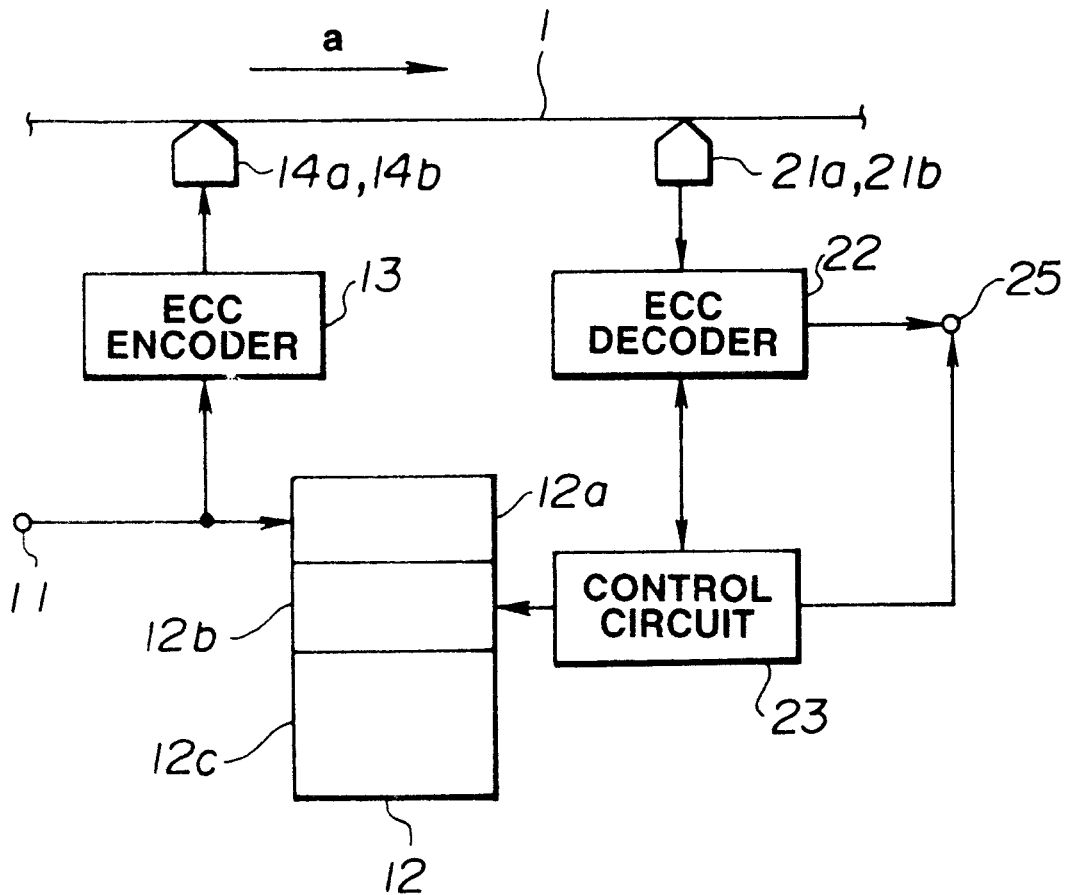
FIG. 1 is a schematic block diagram showing essential portions of a DAT embodying the present invention.

Referring to the drawings, a recording/reproducing method and apparatus for a tape-shaped recording medium according to preferred embodiments of the present invention will be explained in detail. In the following embodiments, the present invention is applied to a digital audio tape recorder (DAT) in which a rotary head mounted on a rotary drum is used for recording digital signals on a magnetic tape and for reproducing digital signals from the magnetic tape. FIG. 1 is a block diagram showing essential portions of the DAT. Referring to FIG. 1, the DAT includes a memory 12 for storing digital data, such as digital audio signals, supplied thereto, such as digital audio data, and an ECC encoder 13 for appending error correction codes to the digital data. The DAT also includes recording heads 14a, 14b for recording digital data on the magnetic tape 1 along with address data, and playback heads 21a, 21b for reading out the digital data recorded on the magnetic tape 1 along with the digital data. The DAT further includes an ECC decoder 22 for detecting errors in the digital data from the playback heads 21a, 21b for correcting errors, and a control circuit 23 for holding the address data read out by the playback heads 21a, 21b and the digital data at least associated with the address data, supplied to the recording heads 14a, 14b, based on error flags specifying the presence of errors in the digital signals from the ECC decoder 22. The specified structure or the track format for the DAT are described in detail in, for example, U.S. Pat. No. 4,739,420.

To a terminal 11 are supplied digital data from an interleaving circuit of the previous stage, not shown, that is interleaved audio data, and address data, such as frame addresses incremented per each revolution of a rotary head as later explained. The memory has its storage area divided into, for example, three memory areas 12a, 12b and 12c, the writing and readout operations for which are controlled by the control circuit 23. The control circuit 23 controls writing in and readout from the areas 12a to 12c. The audio data and the frame addresses, supplied via terminal 11, are stored in the memory areas 12a or 12b.

The ECC encoder 13 appends the product codes (Cl parity and C2 parity) consisting of a matrix array of two Reed-Solomon codes to the interleaved audio data supplied from the terminal 11, and alternately sends the resulting data to the recording heads 14a, 14b. The product code is explained in detail in, for example, the U.S. Pat. No. 4,630,272.

Figure 2:
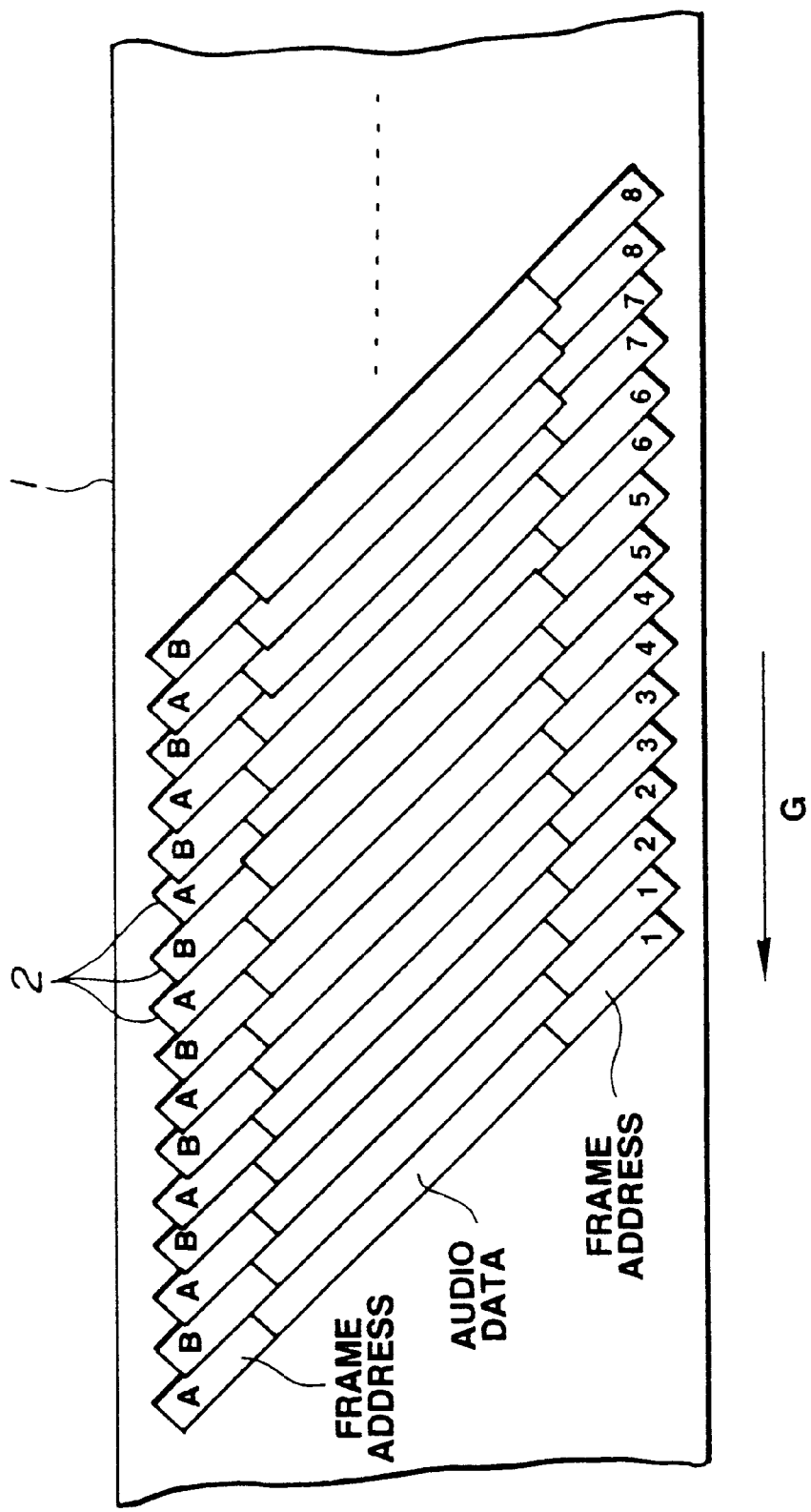
FIG. 2 shows a track formed on a magnetic tape by helical scan.
Figure 3:
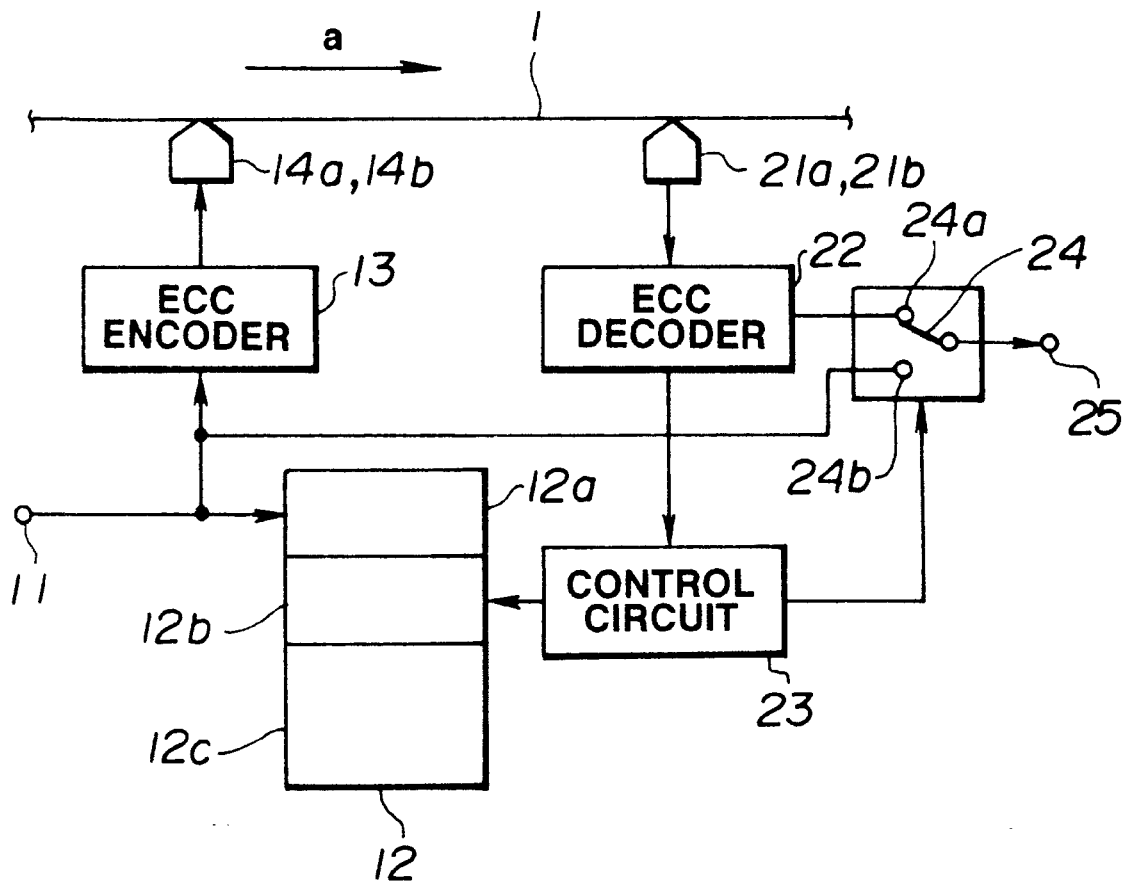
FIG. 3 is a block diagram showing essential portions of a DAT embodying the present invention.

The recording heads 14a, 14b are mounted in a directly oppositely facing relation on a rotary drum, not shown, for recording audio data and frame addresses, to which are appended error correction codes supplied from the ECC encoder 13, by a so-called helical scan system. This sequentially records tracks 2 on a magnetic tape 1 frame having recorded thereon addresses and audio data as shown in FIG. 2. In FIG. 2, A and B entered in the respective tracks indicate that the data and the frame addresses have been recorded by the recording heads 14a, 14b having different azimuths. In FIGS. 1 to 3, an arrow a indicates the running direction of the magnetic tape.

The playback heads 21a, 21b are arranged on the downstream side along the running direction of the magnetic tape 1; that is, the heads 21a, 21b are arranged in the vicinity and at the back of the recording heads 14a, 14b in the rotational direction of the rotary drum, not shown, in diametrically opposite relation to each other. The audio data and the frame addresses recorded by the recording heads 14a, 14b are instantly read out so as to be supplied to the ECC decoder 22. The arrangement of the recording heads 14a, 14b and the playback heads 21a, 21b is described for example in the U.S. Pat. No. 4,873,589.

The ECC decoder 22 detects errors in the audio data using, for example, the C2 parity. If there is any error, the ECC decoder 22 sets an error flag specifying it and sends the error flag and the frame address associated with the error flag to the control circuit 23.

If no error flag is sent from the ECC decoder 22 to the control circuit 23, the control circuit 23 judges that recording is going on in regular manner, and controls the memory 12 so that the audio data supplied from the terminal 11 will be stored alternately on, for example, the memory areas 12a, 12b of the memory 12. If an error flag is sent from the ECC decoder 22 to the control circuit 23, the control circuit judges that recording is not going on in a regular manner, and controls the memory 12 so that the audio data and the frame address stored in the memory areas 12a, 12b in association with the frame address for which the error flag supplied from the ECC decoder 22 is set will be transferred to the area 12c.

The recording capacity of each of the memory areas 12a, 12b of the memory 12 substantially corresponds to the time since the audio data is supplied via terminal 11 to the memory 12 until the error flag is supplied to the control circuit 23. The control circuit 23 records the audio data and the frame addresses on the magnetic tape 1 using the recording heads 14a, 14b, while alternately storing the audio data or the like on the areas 12a or 12b. Moreover, the control circuit 23 controls the various parts for monitor-reproducing audio data for confirming, based on the output of the playback heads 21a, 21b, whether or not the recording on the magnetic tape 1 is going on normally. The control circuit 23 also controls the memory 12 so that, if, as a result of monitor reproduction, there is any error in the audio data read out from the magnetic tape 1, the audio data in error and the frame address will be transferred to and held in the memory area 12c of the memory 12. For judging whether or not the audio data and the frame data are correctly recorded on the magnetic tape 1, the control circuit 23 can directly compare the audio data read out from the magnetic tape 1 to the audio data stored in the memory 12 in order to judge whether or riot recording has been done correctly, instead of using the C2 parity for giving the decision. In the case of overwriting, it occurs that, although only on rare occasions, the old data recorded prior to the present recording operation is read out from the magnetic tape 1 and has correct parity, such a decision based on the C2 parity tends to lead to a mistaken detection. The above-mentioned method of direct comparison is effective to evade this risk.

Each time an error is detected by the ECC decoder 22, the control circuit 23 holds the audio data in error and the frame address in the memory area 12c of the memory 12 until recording of all audio data comes to a close. If, on the basis of an input from an operating panel, not shown, a command for termination of recording is issued, or if the magnetic tape is about to come to a close, the control circuit 23 halts the recording of audio data on the magnetic tape 1. The control circuit 23 performs control for reading out the audio data and the frame address, so far held in the memory area 12c of the memory 12, and records these audio data and the frame address along with the identification flag (start ID) specifying that the audio data and the frame address are data distinct from the usual audio data. The control circuit 23 also performs control so that the above audio data in error and so forth will be recorded after recording discrimination data, such as 'O' data, for some time on the magnetic tape 1. That is, if the audio data held in the memory 12 without recording the discrimination data (referred to hereinafter as audio data of an erroneous site) are recorded immediately, and if the playback heads 21a, 21b scan the portion of the recording medium where the audio data of the erroneous site has been recorded, an unusual sound tends to be outputted. There is a risk that the unusual sound sustains for about one second.

After recording the discrimination data in an area next succeeding the record end point of audio data on the magnetic tape 1, the audio data of the erroneous site is recorded next to the discrimination data. If recording has not been done correctly due to, for example, dropout in the course of recording, all audio data, inclusive of the data of the portion where recording has not been done correctly, can be recorded on the magnetic tape 1. Since the audio data in the site where dropout or a like defect has occurred is held in the memory 12 so as to be then collectively recorded on the magnetic tape 1, a shorter time suffices for recording the audio data of the erroneous site. In order to specify that the audio data of the erroneous site has been recorded next to the audio data recording area on the magnetic tape 1, it suffices to record a discrimination flag in the table-of-contents area (TOC area).

In the above-described embodiment, the audio data supplied from the terminal 11 is supplied to the memory 12 and to the ECC encoder 13. It is, however, possible to provide a memory 12 between the memory 12 and the ECC encoder 13 and to supply the audio data supplied via the terminal 11 to the ECC memory 12 via terminal 11. That is, it is possible to store the audio data temporarily in the encoder 13 and to read out the data therefrom to route the data to the ECC encoder 13.

In the above-described embodiment, the audio data of the erroneous site is recorded in an area of the magnetic tape 1 next succeeding the area where regular audio data has been recorded. It is, however, possible to record the data of the erroneous site in an area preceding the area where the regular audio data has been recorded, for example, in a pre-set area at the leading end of the magnetic tape 1. The audio data of the erroneous site may also be recorded in a pre-set area towards the end of the magnetic tape 1. In recording the audio data of the erroneous site in the preceding area, discrimination data is recorded between the preceding area and the area of recording of the audio data. The start ID is also recorded at the leading end position of the preceding area.

The audio data of the erroneous site may also be re-recorded in the area in which recording has not been made as regularly. Specifically, should an error be found to have occurred in the course of monitor reproduction, the error may have occurred in the recording system or in the playback system, such that the it is not necessarily the magnetic tape that is responsible for such errors. The area of the magnetic tape 1 where the error has been produced is again reproduced based on the frame address held by the memory 12 in order to judge whether the error will occur. If no error occurs, it is judged that the error has been produced in the reproducing system during monitor reproduction and that the correct recording has been done on the magnetic tape 1. Based on this judgment, recording of the audio data of the erroneous site on the magnetic tape 1, which is performed at the time of the end of the recording operation, is discontinued. If the error is again produced, the audio data of the erroneous site is recorded in the area of the magnetic tape 1 corresponding to the frame address held in the memory 12 while the above-mentioned monitor reproduction is carried out.

The playback operation for the DAT is hereinafter explained.

If the audio data has been recorded unobjectionably on the magnetic tape, that is, if there is no discrimination flag recorded in the above-mentioned TOC area, the control circuit 23 executes the usual playback operation. The ECC decoder 22 corrects the audio data supplied from the playback heads 21a, 21b for errors by the product codes and routes the error-corrected audio data via terminal 25 to a deinterleaving circuit of the succeeding stage. This reproduces the audio data.

On the other hand, if the audio data of the erroneous site is recorded in an area succeeding the area of the magnetic tape 1 where the regular audio data has been recorded, the control circuit 23 manages control for performing a high-speed search of the start ID as the above-mentioned discrimination flag, recorded along with the audio data of the erroneous site, and controls the playback heads 21a, 21b and the ECC decoder 22 for reproducing the audio data of the erroneous site from the area where the start ID has been detected. At this time, the control circuit 23 writes the reproduced audio data of the erroneous site and the time information representing the area in the memory 12. If there is provided a pre-set area in the magnetic tape 1 in advance for recording the audio data of the erroneous site, it suffices to access the area for recording the audio data of the erroneous site without performing a high-speed search employing the start ID.

When the writing of the audio data of the erroneous site in the memory 12 comes to a close, the control circuit 23 starts reading out the audio data, using the playback heads 21a, 21b, beginning from the leading end of the area where the desired audio data of the magnetic tape 1 has been recorded, using the playback heads 21a, 21b. The control circuit 23 compares the frame address stored in the memory 12 to the frame address read out from the playback heads 21a, 21b in order to judge whether or not the playback heads 21a, 21b have started scanning the area of the magnetic tape 1 associated with the audio data of the erroneous site held on the memory 12.

If, on comparison, the frame address stored n the memory 12 is coincident with the frame address read out by the playback heads 21a, 21b, the control circuit 23 causes not only audio data to be read out from the playback heads 21a, 21b, but also the audio data stored in the memory to be read out and routed to the terminal 25. The data read out from the playback heads 21a, 21b and decoded by the ECC decoder 22 are not outputted by the decoder 22 and are instead disregarded, or the decoding by the ECC decoder 22 is not carried out, as a result of which the data recorded on the magnetic tape 1 is reproduced as if no dropout had occurred and only the correct data had been recorded, even though erroneous data have been recorded on the magnetic tape 1.

In the above-described embodiment, the audio data of the erroneous site are recorded on the magnetic tape 1 in succession to termination of the audio data recording operation. Alternatively, the audio data of the erroneous site may be held in the memory 12 and, for reproduction, the audio data reproduced from the magnetic tape 1 or the audio data stored in the memory 12 may be outputted by switching selection. This embodiment is shown in FIG. 3, in which parts or components used in common with FIG. 1 are denoted by the same reference numerals and the detailed description is omitted for simplicity.

FIG. 3 shows a DAT having a switching circuit 24 for selectively supplying audio data outputted by the ECC decoder 22 and the audio data stored in the memory 12 under control by the control circuit 23 to a terminal 25. This switching circuit 25 switches between contacts 24a and 24b based on a control signal from the control circuit 23. To the contacts 24a and 24b, there are supplied audio data from the ECC decoder 22 and the audio data read out from the ECC decoder 22. The control circuit 23 compares the frame address stored in the memory 12 to the frame address read out from the playback heads 21a, 21b and sets a movable contact of the switching circuit 24 from the contact 24a to the contact 24b if the two coincide with each other. The result is that the audio data stored in the memory 12 are supplied to the terminal 25 in place of the audio data associated with the data read out by the playback heads 21a, 21b. The result is that the ultimately outputted audio data would appear as if these data had been recorded in a completely error- or dropout-free state on the magnetic tape 1. However, it is necessary for the DAT shown in FIG. 3 to have a memory capacity larger than the memory capacity of the DAT shown in FIG. 1 in view of a certain memory capacity allowance of the magnetic tape used in the DAT of FIG. 3.

The present invention is not limited to the above-described embodiments and may of course be applied to a system in which digital signals such as those of the digital VTR are recorded on a tape-shaped recording medium or recorded digital signals are reproduced from the recording medium.

What is claimed is:

1. A recording/reproducing apparatus for a tape-shaped recording medium comprising:

a memory having a plurality of storage areas for storage in at least one storage area of digital signals supplied thereto;

a first head for recording the supplied digital signals along with address information on the tape-shaped recording medium;

a second head located on a downstream side of said first head in a running direction of the tape-shaped recording medium, said second head reading out the digital signals and the address information recorded on the tape-shaped recording medium by said first head;

detection means for detecting whether any error exists in the digital signals read out by said second head; and control means for causing data to be held in a separate storage area of said memory if said error has been detected by said detection means or if a direct comparison by said control means of said digital signals initially stored in said memory with said digital signals read out from the tape-shaped recording medium by said second head reveals that said recording has not been performed correctly, said data containing the address information read out by said second head and said digital signals supplied to said first head.

2. The recording/reproducing apparatus for a tape-shaped recording medium as claimed in claim 1 wherein, on termination of a recording operation by said first head on said tape-shaped recording medium, said control means causes the data held by said memory to be recorded in an area of said tape-shaped recording medium succeeding an area where the digital signals have been recorded by said first head.

3. The recording/reproducing apparatus for a tape-shaped recording medium as claimed in claim 2 wherein said control means records discrimination data between a recording operation termination position of said tape-shaped recording medium and an area for recording the data stored in said memory, said discrimination data specifying that an area succeeding the recording operation termination position is an area where data stored in the memory has been recorded.

4. The recording/reproducing apparatus for a tape-shaped recording medium as claimed in claim 3 wherein said discrimination data is a start ID.

5. The recording/reproducing apparatus for a tape-shaped recording medium as claimed in claim 2 wherein said control means records a discrimination flag to be recorded in a leading portion of said succeeding area.

6. The recording/reproducing apparatus for a tape-shaped recording medium as claimed in claim 1 wherein said control means records the data held by said memory at a time of termination of recording on the tape-shaped recording medium by said first head in an area preceding an area where the digital signals have been recorded by said first head.

7. The recording/reproducing apparatus for a tape-shaped recording medium as claimed in claim 6 wherein said control means records discrimination data between a leading position of an area of the tape-shaped recording medium where the digital signals have been recorded and an area for recording the data stored in said memory, said discrimination data specifying that an area preceding said leading position is an area where the data stored in said memory has been stored. means, said switching circuit causing at least one of data read out by said second head and the data stored in the memory to be selectively outputted based on a controlling signal from said control means.

8. The recording/reproducing apparatus for a tape-shaped recording medium as claimed in claim 6 wherein said control means records discrimination data between a recording operation termination position of said tape-shaped recording medium and an area for recording the data stored in said memory, said discrimination data specifying that an area succeeding the recording operation termination position is an area where data stored in the memory has been recorded.

9. The recording/reproducing apparatus for a tape-shaped recording medium as claimed in claim 8 wherein said discrimination data is a start ID.

10. The recording/reproducing apparatus for a tape-shaped recording medium as claimed in claim 6 wherein said control means records a discrimination flag to be recorded in a leading portion of said succeeding area.

11. The recording/reproducing apparatus for a tape-shaped recording medium as claimed in claim 1 wherein said control means substitutes data recorded on the tape-shaped recording medium at a time of termination of a recording operation on the tape-shaped recording medium by said first head based on the data stored in the memory in accordance with the address information stored in the memory.

12. The recording/reproducing apparatus for a tape-shaped recording medium as claimed in claim 11 further comprising a switching circuit controlled by said control means, said switching circuit causing at least one of data read out by second head and the data stored in the memory to be selectively outputted based on a controlling signal from said control means.

13. A recording/reproducing apparatus for a tape-shaped recording medium comprising:

a memory having a plurality of storage areas for storage in at least one storage area of digital signals supplied thereto;

an encoder for applying error correction encoding to the supplied digital signals;

a first head for recording the supplied digital signals along with address information outputted from the encoder on the tape-shaped recording medium;

a second head located on a downstream side of said first head in a running direction of the tape-shaped recording medium, said second head reading out the digital signals recorded on the tape-shaped recording medium by said first head along with the address information;

a decoder for applying error correction decoding to data from said second head; and control means which, if, during decoding by said decoder the digital signals read out by said second head are found to contain errors, or if a direct comparison by said control means of said digital signals initially stored in said memory with said digital signals read out from the tape-shaped recording medium by said second head reveals that said recording has not been performed correctly, manages control for storing the address information found to be in error and said digital signals supplied to said first head in association with the address information in a separate storage area of said memory.

14. The recording/reproducing apparatus for a tape-shaped recording medium as claimed in claim 13 wherein said control means judges that the digital signals read out from the second head contain said errors based on an error flag generated at a time of decoding by said decoder.

15. The recording/reproducing apparatus for a tape-shaped recording medium as claimed in claim 14 wherein said control means judges that the digital signals read out from said second head contain said errors by C2 parity of a product code generated at the time of decoding by said decoder.

16. The recording/reproducing apparatus for a tape-shaped recording medium as claimed in claim 14 wherein said control means manages control for recording data held in said memory at a time of termination of a recording operation on the tape-shaped recording medium by said first head in an area of the tape-shaped recording medium succeeding an area where digital signals have been recorded by said first head.

17. The recording/reproducing apparatus for a tape-shaped recording medium as claimed in claim 16 wherein said control means records discrimination data between a recording operation termination position of said tape-shaped recording medium and an area for recording the data stored in said memory, said discrimination data specifying that an area succeeding to the recording operation termination position is an area where data stored in the memory has been recorded.

18. The recording/reproducing apparatus for a tape-shaped recording medium as claimed in claim 17 wherein said discrimination data is a start ID.

19. The recording/reproducing apparatus for a tape-shaped recording medium as claimed in claim 14 wherein said control means records a discrimination flag in a leading portion of said succeeding area.

20. The recording/reproducing apparatus for a tape-shaped recording medium as claimed in claim 14 wherein said control means causes data held in the memory at a time of termination of recording on the tape-shaped recording medium by said first head to be recorded in an area preceding an area where the digital signals have been recorded by said first head.

21. The recording/reproducing apparatus for a tape-shaped recording medium as claimed in claim 20 wherein said control means records discrimination data between a leading position of an area of the tape-shaped recording medium where the digital signals are recorded and an area of the tape-shaped recording medium where the data stored in the memory is recorded, said discrimination data specifying that an area preceding the leading position is an area where the data stored in the memory has been recorded.

22. The recording/reproducing apparatus for a tape-shaped recording medium as claimed in claim 20 wherein said control means records a discrimination flag in a leading portion of said succeeding area.

23. The recording/reproducing apparatus for a tape-shaped recording medium as claimed in claim 14 wherein said control means records discrimination data between a recording operation termination position of said tape-shaped recording medium and an area for recording the data stored in said memory, said discrimination data specifying that an area succeeding the recording operation termination position is an area where data stored in the memory has been recorded.

24. The recording/reproducing apparatus for a tape-shaped recording medium as claimed in claim 23 wherein said discrimination data is a start ID.

25. A reproducing apparatus for a tape-shaped recording medium, said tape-shaped recording medium having a first area where a digital signal has been recorded along with first address information and a second area where a correct digital signal corresponding to a site where an error has occurred at a time of recording in the first recording area has been recorded along with second address information, comprising:

a head for reading out digital signals recorded on the tape-shaped recording medium;

a memory having a plurality of storage areas for storing in a separate storage area correct digital signals recorded in said second area of the tape-shaped recording medium read out by said head, wherein said correct digital signals are stored in said separate storage area based on said error detected by a direct comparison of said digital signals initially stored in said memory with said digital signals read out from the tape-shaped recording medium by said head; and control means for substituting the correct digital signal stored in said separate storage area of said memory for the digital signal read out by said head where said error has occurred.

26. The reproducing apparatus for a tape-shaped recording medium as claimed in claim 25 wherein said control means causes the correct digital signal recorded in said second area of said tape-shaped recording medium to be read out before reading out the digital signal recorded by said head in the first area of the tape-shaped recording medium.

27. The reproducing apparatus for a tape-shaped recording medium as claimed in claim 26 wherein said control means causes the correct digital signals to be read out from said memory in place of the digital signals read out from said head in case of coincidence of the second address information stored in the memory with the first address information read out by said head.

28. A recording/reproducing method for a tape-shaped recording medium comprising the steps of:

providing a memory having a plurality of storage areas;

recording digital signals supplied by a first head via the memory on the tape-shaped recording medium along with address information;

reading out the digital signals recorded by said first head on the tape-shaped recording medium along with the address information by a second head positioned on a downstream side of said first head in a running direction of the tape-shaped recording medium;

detecting if there is any error in the digital signals read out by said second head; and causing data containing the address information read out by said second head and the digital signals supplied to said first head to be stored in a separate storage area of said memory if, as a result of said detection the digital signals read out by said second head contain said error or if a direct comparison by said control means of said digital signals initially stored in said memory with said digital signals read out from the tape-shaped recording medium by said second head reveals that said recording has not been performed correctly; said digital signals supplied to said first head being the digital signals at least associated with said address information.

29. The recording/reproducing method for a tape-shaped recording medium as claimed in claim 28 wherein, on termination of a recording operation by said first head on said tape-shaped recording medium, data held by said memory is recorded in an area of said tape-shaped recording medium succeeding an area where the digital signals have been recorded by said first head.

30. The recording/reproducing method for a tape-shaped recording medium as claimed in claim 29 wherein discrimination data is recorded between a recording operation termination position of said tape-shaped recording medium and an area for recording the data stored in said memory, said discrimination data specifying that an area succeeding the recording operation termination position is an area where the data stored in the memory has been recorded.

31. The recording/reproducing method for a tape-shaped recording medium as claimed in claim 30 wherein discrimination data is a start ID.

32. The recording/reproducing method for a tape-shaped recording medium as claimed in claim 29 wherein a discrimination flag is recorded in a leading portion of said succeeding area.

33. The recording/reproducing method for a tape-shaped recording medium as claimed in claim 28 wherein data held by said memory at a time of termination of recording on the tape-shaped recording medium by said first head is recorded in an area preceding an area where the digital signals have been recorded by said first head.

34. The recording/reproducing method for a tape-shaped recording medium as claimed in claim 33 wherein discrimination data is recorded between the leading position of an area of the tape-shaped recording medium where the digital signals have been recorded and an area for recording the data stored in said memory, said discrimination data specifying that an area preceding said leading position is an area where the data stored in said memory has been stored.

35. The recording/reproducing method for a tape-shaped recording medium as claimed in claim 33 wherein a discrimination flag is recorded in a leading portion of said succeeding area.

36. The recording/reproducing method for a tape-shaped recording medium as claimed in claim 28 wherein discrimination data is recorded between a recording operation termination position of said tape-shaped recording medium and an area for recording the data stored in memory, said discrimination data specifying that an area succeeding the recording operation termination position is an area where data stored in the memory has been recorded.

37. The recording/reproducing method for a tape-shaped recording medium as claimed in claim 28 wherein said discrimination data is a start ID.

38. The recording/reproducing method for a tape-shaped recording medium as claimed in claim 28 wherein data recorded on the tape-shaped recording medium at a time of termination of a recording operation on the tape-shaped recording medium by said first head is substituted based on data stored in the memory in accordance with the address information stored in the memory.

* * * * *